UNITED STATES PATENT OFFICE 2,628,971

ESTERS OF ALKYLXANTHIC FORMIC ACID

Robert Ben Booth, Springdale, and Charles Elsworth Light, Noroton Heights, Conn., assignors to American Cyanamid Company, New York, N. Y., a corporation of Maine No Drawing. Application June 25, 1947, Serial No. 757,057

6 Claims. (Cl. 260—455)

This invention relates to new sulfur-containing compounds which are primarily useful in flotation processes.

A number of sulfur-containing compounds have achieved major importance for flotation and other purposes. These compounds are the xanthates and dithiophosphates and certain reaction products with chlorides of sulfur. The compounds of this invention are reaction products of chloroformates of glycols and diglycols with xanthates. Two types of compounds can be prepared, those in which the xanthate is reacted with the glycol chloroformate in equimolar proportions and those where two mols of xanthate are reacted with one mol of the glycol chloroformate. Both types of compounds are flotation reagents and show improved results when used in the flotation of metal ores such as sulfide and previous metal ores.

The products of the present invention are for the most part oils and are probably represented by the following formulae, using diglycol chloroformate for illustrative purposes:

(1) 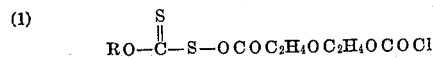

(2) 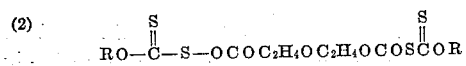

Certain of the compounds of these types are obtainable in a fairly pure form; for example, reaction of 1 mol or 2 mols ethyl xanthate with 1 mol diglycol chloroformate gave products with sulfur analyses close to theoretical. However, some of the reaction products, particularly with the higher xanthates, analyse lower in sulfur content and are probably somewhat impure. It is almost impossible to determine the exact structural formulae of the compounds and it is not desired to limit the present invention to an exact formulae. The type formulae given above represent probabilities and have not been determined with complete accuracy.

It is an advantage of the present invention that the compounds may be prepared by various processes.

One process involves slurrying an alkali metal alkyl xanthate in a suitable organic liquid such as ether, benzene, etc. The glycol chloroformate is then slowly added at a low temperature, for example, below 5° C., and, if necessary, after complete addition the reaction may be completed at room temperature. Inorganic salts are then removed by filtration or leaching with water. The excess solvent is then removed by distillation. A second process involves direct addition of the xanthate to the glycol chloroformate at temperatures preferably below 40° C., followed by washing and drying. A third process is carried out in aqueous medium, the glycol chloroformate being added to a cold water solution of the xanthate, temperature being maintained at about 5° C. The product separates out as an oil and is readily removable from the reaction mixture and dried. This last process presents considerable advantages from a practical standpoint.

It is an advantage of the present invention that any of the ordinary alkali metal alkyl xanthates may be used and it is not necessary to operate with a single xanthate, mixtures being usable to yield compounds which have excellent properties as flotation reagents.

The invention will be described in greater detail in conjunction with the following specific examples, the parts being by weight.

Example 1

One fourth mol of sodium ethyl xanthate and one fourth mol of diglycol chloroformate were reacted by agitation in 200 volume parts ethyl ether below 5° C. for 2 hours. The reaction mixture was filtered to remove solids and the ether distilled off. 71.5 parts by weight of a yellow oil were obtained analyzing 20.9% S (theory for $ClOCOC_2H_4OC_2H_4OCOSCSOC_2H_5 = 20.3\% $ S).

Example 2

A similar reaction for 1 hour was conducted with one fourth mol of sodium secondary butyl xanthate and one fourth mol of diglycol chloroformate. 80.3 weight parts of a yellowish oil were obtained. The product contained 13.1% S (theory = 18.6% S).

Example 3

26.7 parts by weight sodium ethyl xanthate and 19.3 parts diglycol chloroformate were agitated in 200 volume parts ether at 5–6° C. for 4 hours. The ether solution was filtered to remove solids and the ether distilled from the filtrate. A quantitative yield of diethyl xanthogenate diglycol formate was obtained. The product analyzed 30.8% S (Theory 31.8% S). The product boiled at 198° C. (uncorr.). The product was a clear yellow oil.

A similar run was made, in which the reaction time was cut to 2.5 hours. A 99.5% yield of the product was obtained.

*Example 4*

One sixth mol sodium ethyl xanthate was dissolved in 100 parts water by volume and one twelfth mol diglycol chloroformate was added. The mixture was stirred for 6 hours at about 5° C. A yellow oil resulted which was readily separated from the water. The wet product was dried by heating at 130° C. for 2 hours. 91.4% yield of diethyl xanthogenate-diglycol formate was obtained. The product boiled at 197° C. (uncorr.) and was thus identified as a similar product to that obtained in Example 1. The product contained 31.4% sulfur.

*Example 5*

19.3 parts by weight diglycol chloroformate was added to 29.3 parts by weight of sodium isopropyl xanthate in 100 volume parts of ether. The mixture was stirred 2 hours at room temperature and then filtered. The ether was distilled off to give 34 parts by weight of a yellow oil which analyzed 18.8% S.

*Example 6*

The procedure of Example 5 was followed using 31.9 weight parts of sodium secondary butyl xanthate and 19.3 parts diglycol chloroformate. 29 parts of a yellow oil containing 21.8% S were obtained.

*Example 7*

20.2 weight parts ethylene glycol chloroformate was added to 35.2 weight parts sodium isopropyl xanthate in 75 parts water and stirred for 3 hours at 10-15° C. The product, a yellow oil, was obtained in amounts of 29 parts by weight and contained 20.1% S.

*Example 8*

The procedure of Example 7 was followed, using 17.6 weight parts of sodium isopropyl xanthate and 11.2 weight parts trimethylene glycol chloroformate. 16.5 parts by weight of an amber colored oil were obtained, which contained 17.1% S.

*Example 9*

The procedure of Example 7 was followed using 35.2 weight parts of sodium isopropyl xanthate and 28.7 parts dipropylene glycol chloroformate. 39 weight parts of a yellow oil were obtained. This product contained 16.2% S.

*Example 10*

Octadecanediol was treated with phosgene in carbon tetrachloride. 22.3 parts by weight of the resulting dichloroformate were added directly to 16 parts by weight of sodium ethyl xanthate and stirred for 1 hour at room temperature. The reaction mixture was extracted with water to yield 22 weight parts of a yellowish, viscous oil, analyzing 17% S.

*Example 11*

13.3 parts of sodium ethyl xanthate and 21.4 parts potassium amyl xanthate were dissolved in 75 volume parts of water and 19.3 parts of diglycol chloroformate added. The reaction mixture was stirred for 4 hours and was maintained below 5° C. The product, a brownish oil, contained 20.3% S and 35.3 weight parts were obtained.

*Example 12*

Various xanthate-glycol chloroformate reaction products were prepared under different reaction conditions as follows:

| Xanthate | | Chloroformate | | Reaction Conditions | | | Product | |
|---|---|---|---|---|---|---|---|---|
| Type | mol | Type | mol | Medium | Time, hours | Temp., °C. | Type | Parts by weight |
| Potassium Amyl | 0.16 | Diglycol | 0.08 | Ether | 5 | 25 | Amber oil | 38.5 |
| Sodium Ethyl | 0.2 | Ethylene Glycol | 0.1 | Water | 3 | ¹50 | Yellow Oil | 26 |
| Potassium Amyl | 0.2 | ...do... | 0.1 | ...do... | 3 | ¹40 | Brownish Oil | 45 |
| Sodium Ethyl | 0.1 | Triethylene Glycol | 0.05 | ...do... | 3 | ¹30 | Yellow Oil | 16 |
| Do | 0.1 | HOCH₂C≡C—CH₂OH | 0.05 | ...do... | 5 | ¹28 | ...do... | 17 |

¹ This was maximum temperature reached in reaction.

The principal use of the compounds of the present invention is as collectors or promoters in froth flotation, but processes of flotation using these collectors are not claimed herein since they form the subject matter of the co-pending application of Booth and Hill, Serial No. 757,058, filed concurrently herewith.

We claim:

1. An ester of alkylxanthicformic acid having the formula

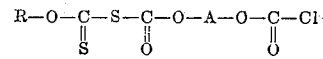

wherein R represents an alkyl group and A represents a divalent aliphatic group.

2. The esters of claim 1 wherein said divalent aliphatic group A is a divalent aliphatic hydrocarbon group having the formula $$-CH_2-(CH_2)_n-CH_2-$$

wherein $n$ is 0 to 16.

3. The ester of claim 1 wherein said divalent aliphatic group A is an aliphatic hydrocarbon group containing at least one ether linkage in the aliphatic chain thereof.

4. An ester of alkylxanthicformic acid having the formula

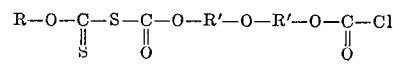

wherein R represents an alkyl group and R' represents a divalent alkyl group.

5. An ester of alkylxanthicformic acid having the formula

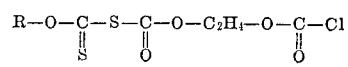

wherein R represents an alkyl group.

6. An ester of alkylxanthicformic acid having the formula $$R-O-\underset{\underset{S}{\|}}{C}-S-\underset{\underset{O}{\|}}{C}-O-C_2H_4-O-C_2H_4-O-\underset{\underset{O}{\|}}{C}-Cl$$

wherein R represents an alkyl group.

ROBERT BEN BOOTH.
CHARLES ELSWORTH LIGHT.

REFERENCES CITED

The following references are of record in the file of this patent:

UNITED STATES PATENTS

| Number | Name | Date |
|---|---|---|
| 1,652,099 | Douglass | Dec. 6, 1927 |
| 1,684,536 | Fischer | Sept. 18, 1928 |
| 2,048,043 | Williams et al. | July 21, 1936 |
| 2,070,634 | Werntz | Feb. 16, 1937 |
| 2,376,242 | Fischer | May 15, 1945 |